No. 818,408. PATENTED APR. 24, 1906.
J. W. BOBBITT & E. HAYES.
SUPPORT FOR VEHICLE TONGUES OR SHAFTS.
APPLICATION FILED SEPT. 1, 1905.
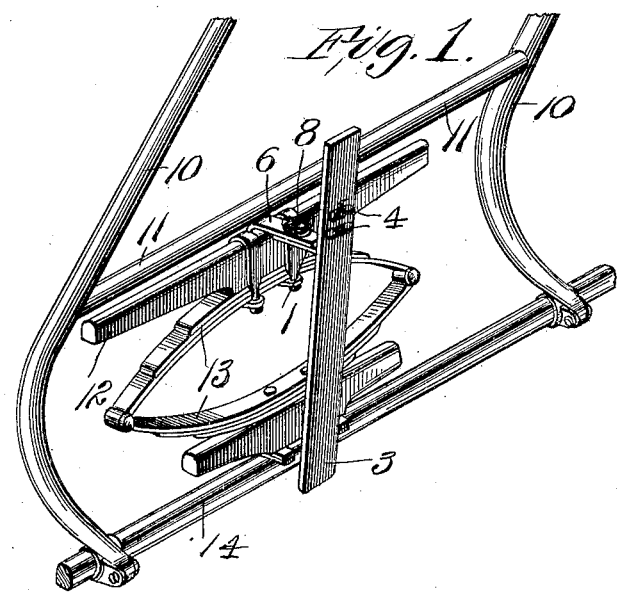
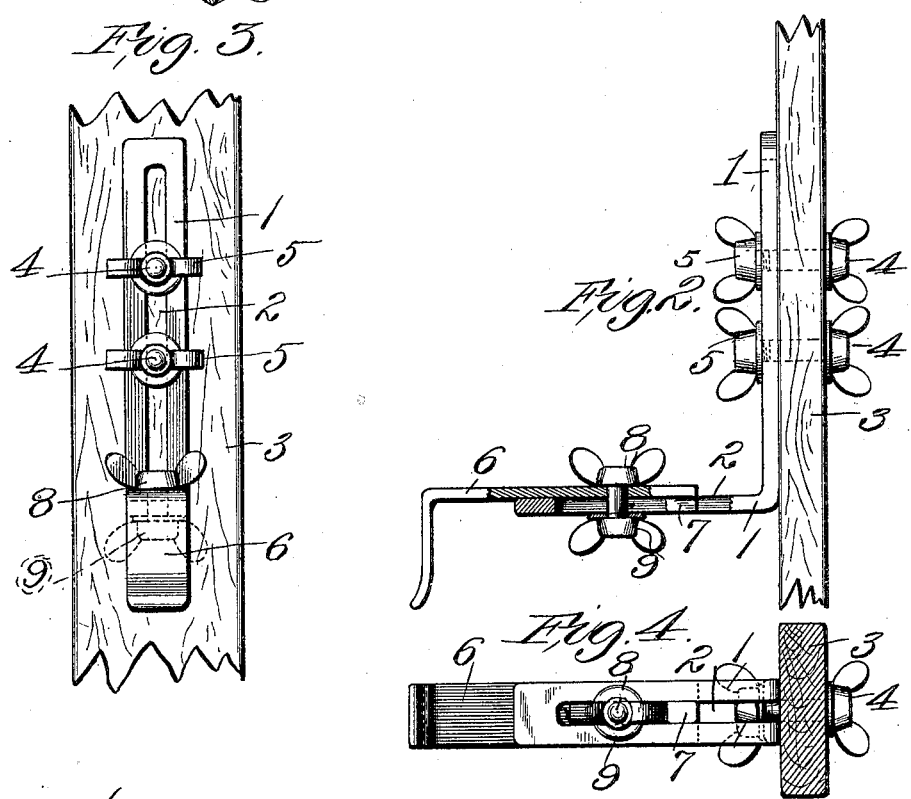

UNITED STATES PATENT OFFICE.

JAMES WALLACE BOBBITT AND EDWARD HAYES, OF JOPLIN, MISSOURI.

SUPPORT FOR VEHICLE TONGUES OR SHAFTS.

No. 818,408.  Specification of Letters Patent.  Patented April 24, 1906.

Application filed September 1, 1905. Serial No. 276,697.

*To all whom it may concern:*

Be it known that we, JAMES WALLACE BOBBITT and EDWARD HAYES, citizens of the United States, residing at Joplin, Missouri, have invented a new and useful Support for Vehicle Tongues or Shafts, of which the following is a specification.

This invention relates to supports for vehicle tongues and shafts; and it consists of the novel construction, combination, and arrangement of parts herein shown, described, and claimed; and the object of our invention is to produce an easily-adjustable device which can be applied in connection with the front spring, cross-bar, or axle of the vehicle to form a support adapted to engage under the Y of the tongue or the cross-piece connecting the shafts, and so hold up the tongue or shafts for various desirable purposes.

In the drawings we have shown one form of our invention and one method of its application in use.

Figure 1 is a view of a device connected to the body-support on the spring and the axle and upholding the shafts of a one-horse vehicle. Fig. 2 is a side elevation of a portion of the device, showing the adjustable connection between the parts. Fig. 3 is a top view showing the connection between the hook device and the arm which engages the tongue or shafts. Fig. 4 is a view showing further the arrangement of the adjustable hook in connection with the supporting member.

Like numerals indicate like parts in the various figures of the drawings.

The numeral 1 indicates an angular metallic member having a longitudinal slot 2 therein. The said member 1 is fastened to a supporting-bar 3, which may be of wood or any other preferred material, by means of bolts or screws 4, inserted through holes in said bar 3 and through the slot 4 and held by nuts 5. It will be understood that the bolts or screws 4 may be of the thumb-screw type, as shown, or they may be ordinary bolts adapted to be set and loosened by means of a wrench or like instrument. By loosening the nuts 5 slightly the member 1 can be moved to any desired position on the bar to permit the latter to project a greater or less distance, as required to engage and support tongues or shafts of the various constructions.

6 indicates a hook adapted to bind against the protruding arm of the member 1 and having a lug 7 extending into the slot 2 in said arm. A bolt or screw 8 passes through a hole in said hook and through the slot 2 and is held by a nut. This bolt or screw may be of the thumb-screw type to afford means for manual adjustment, or it may be of any other suitable arrangement.

So far the device is complete. In using the same the shafts 10 are raised to the required position, and the upper end of the supporting-bar 3 is passed under the cross-connection 11 between the shafts. The hooked end of the member 6 is then engaged over the body-support 12, which ordinarily rests upon the front spring 13; but if the vehicle is of that construction in which the body-support does not rest on the spring then the said member is hooked over the top of the spring. We have shown the former construction, and the latter will be so obvious to those knowing the purpose and function of the device as to render distinctive illustration unnecessary. When so adjusted, the lower end of the supporting-bar 3 bears against the lower front side of the spring 13 or against the axle 14, depending upon the length of the said bar 3 and the position to which the member 1 is adjusted thereon. By loosening the screws or bolts 4 the member 1 and the bar 3 may be moved relatively to give to the latter longer or shorter reach, as required for making proper engagement with the cross-piece 11 or under the Y of a tongue. Furthermore, by adjusting the hook 6 on the member 1 the device can be accommodated to almost any class of vehicle and made to support the tongue at the desired altitude.

This device is useful for sustaining the tongue or shafts in lieu of those supports arranged to rest upon the ground. It is more convenient in that it permits the vehicle to be moved without endangering the stability of the support or altering the altitude of the tongue or shafts. It also facilitates the placing of the animal so that the shafts may be lowered to position much quicker and more easily than if the shafts were upheld by hand while the horse is led to position. For such reason it is especially useful in hitching refractory animals or those which can only be led or backed to position between the lowered shafts with difficulty.

We have shown one form of this device which we have found to meet all practical requirements.

We are aware that various modifications or changes may be made in the arrangement of the various parts and in their combination together without in the least departing from the spirit and scope of the invention. Therefore we do not restrict ourselves to specific structures; but

What we claim as new, and desire to secure by Letters Patent, is—

1. A device of the character described, comprising a bar, an angular member having a slot extending longitudinally therein, bolts or screws extending through said slot and through the bar to bind the angular member and bar together, finger-and-thumb hold on each bolt or screw, a hook, a bolt or screw extending therethrough and through the said slot in the bar, finger-and-thumb hold on said bolt or screw, and a lug on said hook projecting into the slot, substantially as specified.

2. A device of the character described, comprising a bar adapted to connect with the vehicle tongue or shaft and abut against the spring or axle, an angular member having one arm resting upon the bar and a longitudinal slot in the other arm, a clamp binding the angular member and the bar together, a hook, a bolt extending through the hook and through the slot in the arm of the angular member, and a lug integral with said hook projecting into the slot aforesaid to prevent the hook from turning on the bolt, substantially as specified.

3. A device of the character described, comprising a bar, an angular member having one arm bearing against the bar and having a slot in said arm, bolts extending through the bar and through the slot to bind the angular member and the bar together, said angular member having a slot extending longitudinally in its outer arm, a hook, a bolt extending through the hook and through the slot in the outer arm of the angular member to bind the two parts together, and a lug on the inner end of the hook projecting into the slot in the angular member to prevent the hook from turning, substantially as described.

4. A device of the character described, comprising a bar, an angular member having one arm bearing against said bar and having a slot in said arm, a bolt having finger-and-thumb hold on one end, extending through said slot and through the bar, a nut having finger-and-thumb hold, screwed onto the bolt, a hook, a bolt having finger-and-thumb hold on one end, extending through the hook and one arm of the angular member, a nut having finger-and-thumb hold, screwed onto said last-named bolt, and a lug on the inner end of the hook in engagement with the angular member to prevent the hook from turning on the bolt, substantially as described.

In testimony whereof we hereto affix our signatures in the presence of two witnesses.

JAMES WALLACE BOBBITT. [L. S.]
  EDWARD HAYES. [L. S.]

Witnesses:
  MERCER ARNOLD,
  HORACE MERRITT